United States Patent [19]
Freeman

[11] 3,949,964
[45] Apr. 13, 1976

[54] ELECTROMECHANICALLY-OPERATED VALVE

[75] Inventor: Willie B. Freeman, Monroeville, Pa.
[73] Assignee: Westinghouse Electric Corporation, Pittsburgh, Pa.
[22] Filed: Feb. 13, 1975
[21] Appl. No.: 549,569

[52] U.S. Cl. ................ 251/76; 251/129; 251/63.4
[51] Int. Cl.² ........................................ F16K 31/06
[58] Field of Search ............... 251/76, 75, 63.4, 129

[56] References Cited
UNITED STATES PATENTS
2,576,578   11/1951   Dalrymple .................... 251/76 X Primary Examiner—Arnold Rosenthal
Attorney, Agent, or Firm—W. R. Crout

[57] ABSTRACT

An improved electromechanically-operated valve is provided having a main balanced piston-valve controlling an inlet port, and a cooperable relatively-movable valve-stem piston-assembly electrically actuated by a repulsion coil, for example, or a similar electrically-energizable coil, repelling an anvil, for example, secured to said valve-stem piston-assembly.

Upon reduced voltage, the actuating coil has less energy, and is only able to effect opening movement of the valve-stem piston-assembly, which, upon its opening motion, opens, by valve action, an additional piston-surface area for a high-pressure region fed by a bypassing high-pressure gas-inlet port.

9 Claims, 7 Drawing Figures

ELECTROMECHANICALLY-OPERATED VALVE

BRIEF SUMMARY OF THE INVENTION

An improved electrically-actuated valve-assembly is provided, including a main balanced piston-valve closing and controlling the main inlet and outlet ports of the valve body. Relatively movable with respect to the main piston-valve is a smaller valve-stem piston-assembly electrically driven by an energized coil, such as a repulsion coil, for example, to directly force, by abutment action, the main balanced piston-valve. Upon reduced voltage, however, the valve-stem piston-assembly opens up an additional piston area to a high-pressure gas region fed by a bypassing high pressure gas-inlet passage provided in the valve body. As a result, high-pressure gas acting upon the increased piston-surface area of the valve-stem piston-assembly will provide an additional force, thereby augmenting the impact force created by the electrical coil itself.

DESCRIPTION OF THE PREFERRED EMBODIMENTS

Figure 1:
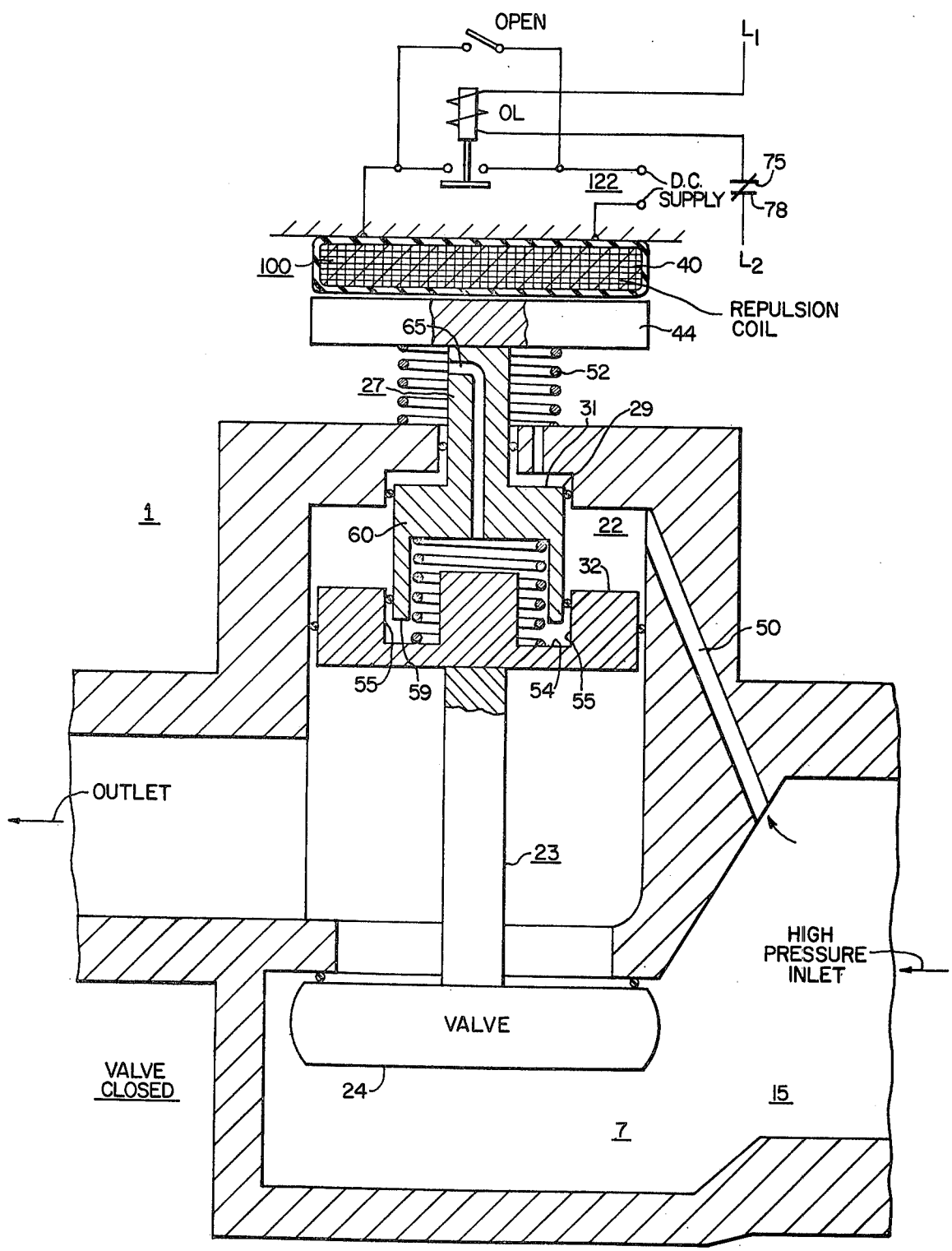
FIG. 1 is a generally diagrammatic view of an improved electrically-actuated valve-assembly embodying the principles of the present invention, the valve being shown in the closed position.
Figure 2:
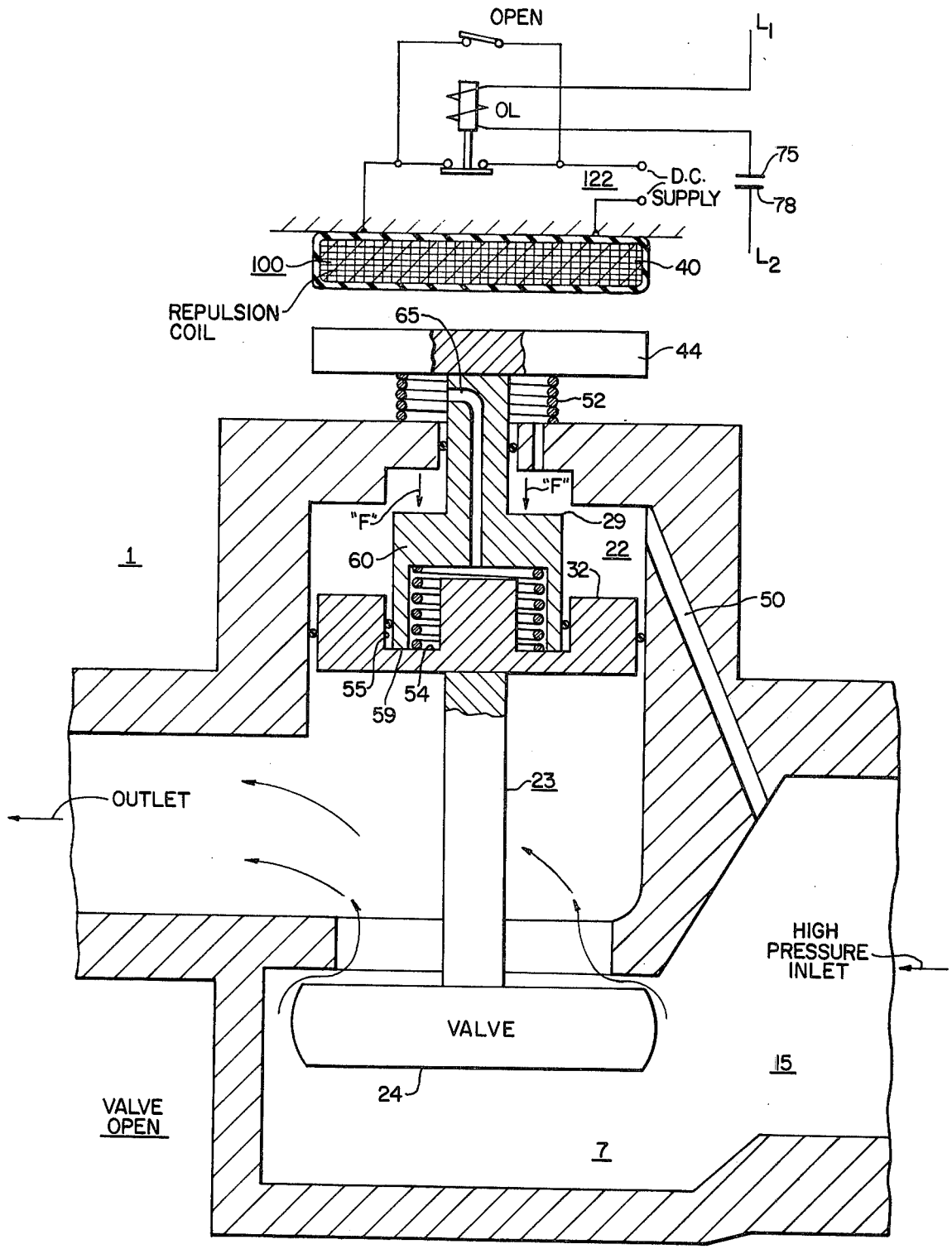
FIG. 2 is a view similar to that of FIG. 1, but showing the position of the several parts during low-voltage conditions, when an additional augmenting pneumatic force is utilized, in addition to the electrical force to effect opening of the main valve.

Referring to the drawings, and more particularly to FIGS. 1 and 2 thereof, the reference numeral 1 generally designates the improved electrically-actuated valve-assembly of the present invention. As observed in FIGS. 1 and 2, it will be noted that there is provided an electrical coil, such as a repulsion coil 40, for example, which, upon energization, effects a repulsive force upon an anvil-head 44, which may constitute, optionally, an integral part of a valve-stem piston-assembly, generally designated by the reference numeral 27, and relatively movable within a recess portion 55 of the balance piston 32 of a main piston-valve 24.

This valve stem-piston assembly 27 may be held in place by compression spring 52.

Under high-voltage conditions, such as 140 volts D.C. for example, or, alternatively, under normal-voltage conditions, such as 125 volts, for example, the electroactuated coil 40 has sufficient energy by itself alone to effect an adequate mechanical thrust force condition exerted upon the anvil head 44, and thus cause abutment of the lower surface 59 of the pilot-piston 60 directly against the bottom 54 of the recess 55 of the balance piston 32. This abutment condition is illustrated in FIG. 2, and immediately causes opening of the main piston-valve 24.

Under reduced voltage conditions, say voltages less than 125 volts, the diminished mechanical thrust force available from the electrically-actuated coil 40 is supplemented by an additional pneumatic actuating thrust force exerted by the opening of the peripheral edge 29 of the pilot-piston 60 to the high-pressure gas 15, such as air, for example, existing in the region 22, and able to act downwardly upon the upper annular piston surface 31 of the pilot-piston 60. This supplementary pneumatic force augments the mechanical force exerted by the electrical coil 40 itself, and thus effects quick opening of the main valve 24.

In order to provide high-speed operation of an electromechanical pneumatic valve 24, a powerful electrical coil 40 is employed, which drives the valve-poppet 24 directly open. However, at reduced voltages this electrical coil 40 does not have sufficient force by itself alone to open the main valve-poppet 24 against its back pressure, resulting from the high-pressure region 28 existing in the valve-inlet region 7. The present invention makes possible the quick operation of the valve 24 at reduced coil voltages with a somewhat longer opening time, and at normal coil voltages still allows the valve-poppet 24 to be driven open directly by the electrical coil force, which is necessary for high-speed operation of the main valve 24.

During normal voltage operation, the electrical coil 40, such as the repulsion coil, for example, at normal voltage produces sufficient force by itself to drive the valve-stem piston-assembly 27 directly against the poppet assembly 23, and thereby directly forces the valve-poppet 24, open.

Under reduced-voltage condtions, it will be noted that during such low-voltage conditions the electrical coil 40 may only produce enough force to drive the valve-stem piston-assembly 27 far enough to allow high-pressure gas to be exposed to the piston-face area 31, and thus provide sufficient additional pressure force to open the valve poppet 24. In this mode of operation, the coil and valve-stem piston-assembly 27 act as a pilot valve, which operates the main valve-poppet 24, and thus opens the air valve. However, this will also reduce the speed of operation of the main air valve 24.

At slightly-reduced voltages, on the other hand, the valve-poppet 24 is opened by a combination of the force applied directly from the coil 40, and also the pressure-force "F" against the piston surface area 31 of the valve-stem piston-assembly 27. As voltage to the coil 40 is increased, it becomes the primary driving force opening the valve 24.

Figure 3A:
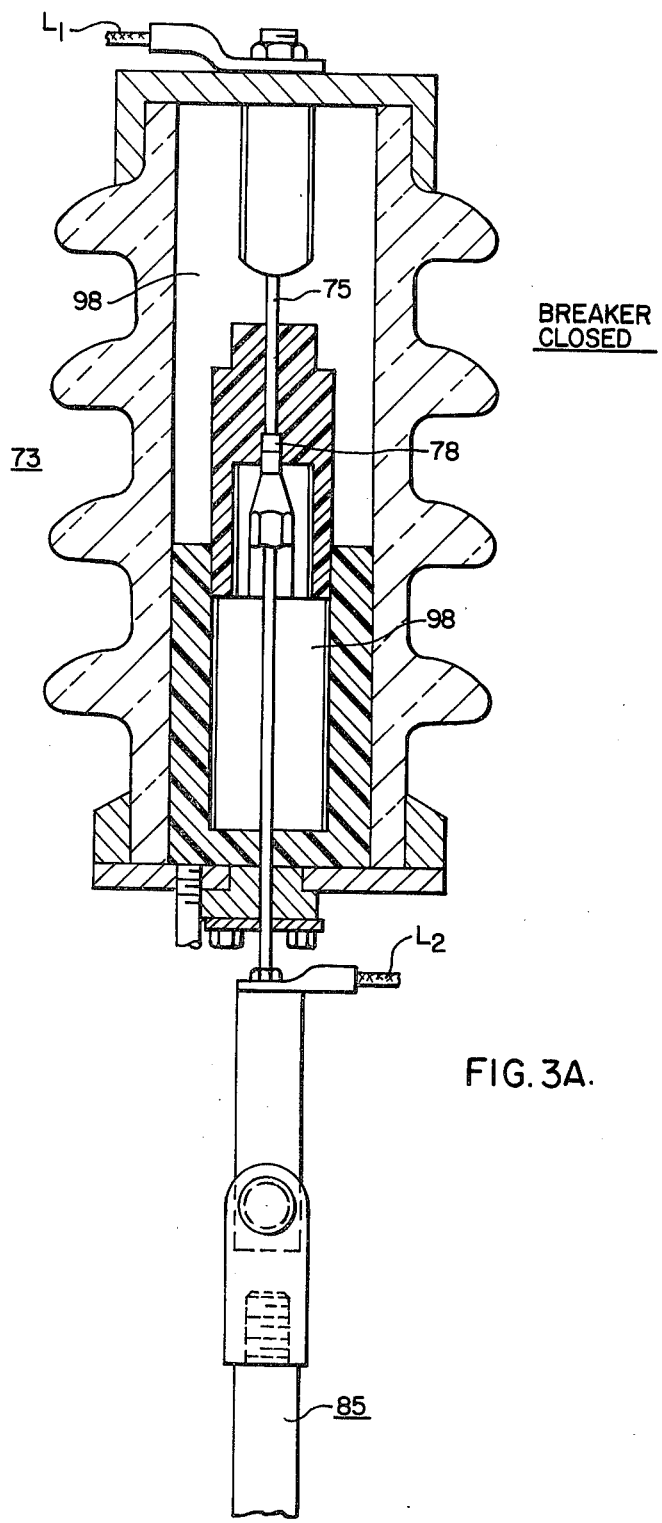
FIGS. 3A and 3B collectively show another embodiment of the invention illustrating a commercial form thereof adaptable for circuit-breaker opening operation with the valve being shown closed.
Figure 3B:
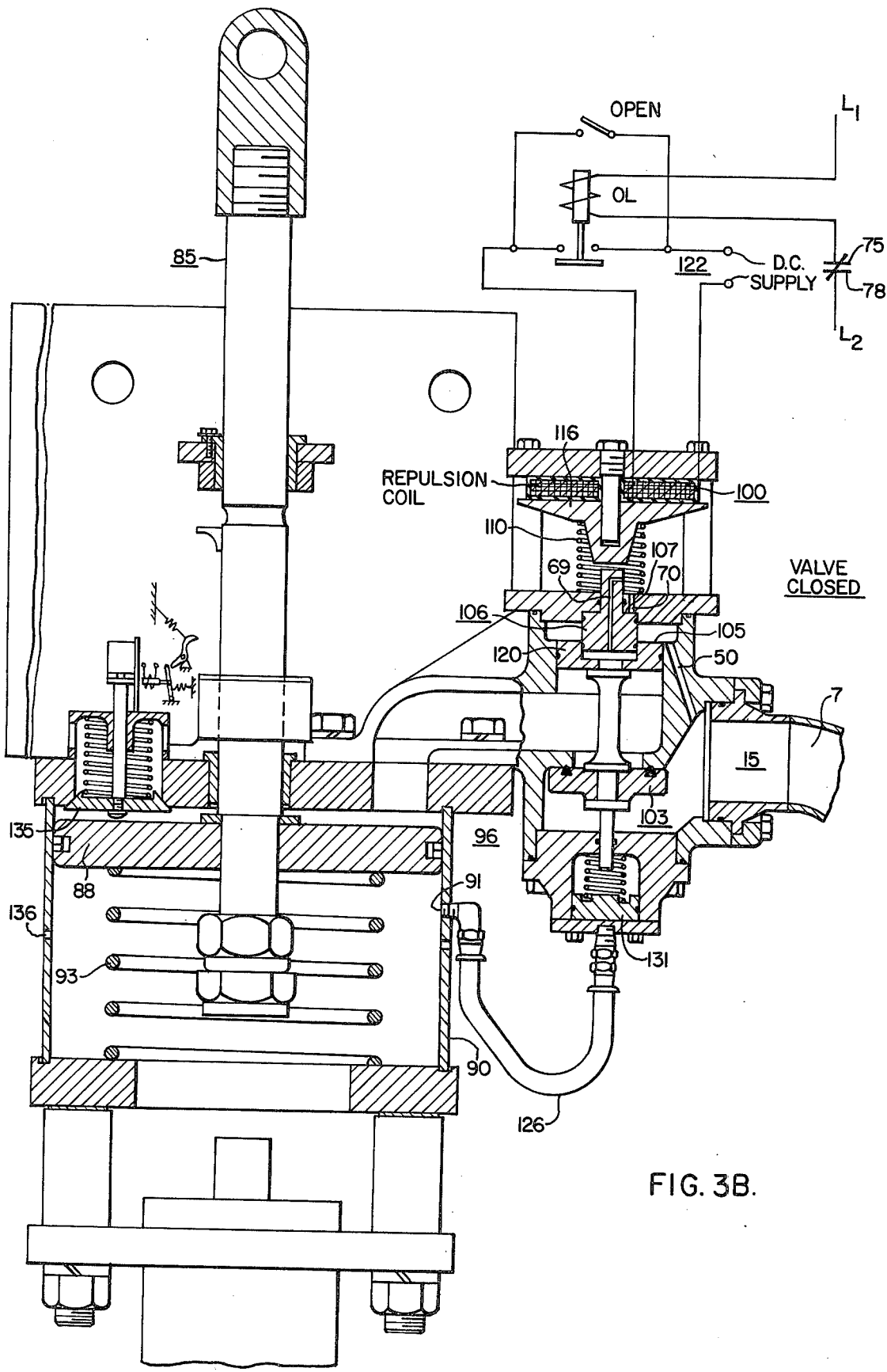

FIGS. 3A and 3B illustrate a commercial form of the invention, in which the improved valve of my invention is utilized to open a circuit-breaker movable contact 78, and to charge the closing springs 93 associated therewith. In other words, the circuit-breaker 73 is opened by piston action 88 and closed by spring action 93.

The mechanism 96 was developed to provide an air-powered trip operation of the "puffer" interrupter 73. Conventional-type circuit-breaker mechanisms of the prior art are spring-opened and air-closed. The closing air valves are actuated by solenoid pilot-valve arrangements, and require several cycles of 60 hertz in time to operate. In order to reduce this time my invention provides a repulsion coil 100 used to drive the valve-poppet 103 open directly. However, at reduced voltages to the coil's power-supply, i.e., 70 – 120 volts DC, it was found that the repulsion coil 100 could not unseat the main valve-poppet 103.

This valve, generally designated by the reference numeral 103, opens in several milliseconds, and provides separable contact part 75,78 within one cycle. In the closed position of the valve 103, as shown in FIG. 3B, high-pressure air 15, provided through the valve inlet 7, is sealed at the poppet-assembly 103. High-pressure air 15 is also maintained on top 105 of the balance piston valve 120 by a small air passage 50. The net force seating the valve poppet 103 is minimized by the counterbalancing force on the balance piston 120. Atmospheric air is supplied through vent passages 69,70 to both sides of the floating-stem piston-assembly 106, which is held into position by a compression bias spring (not shown). A simpler arrangement would be to attach the valve-stem 106 rigidly to the anvil 116 (not shown), then member 106 would be retrieved by the anvil bias spring 110.

Figure 4A:
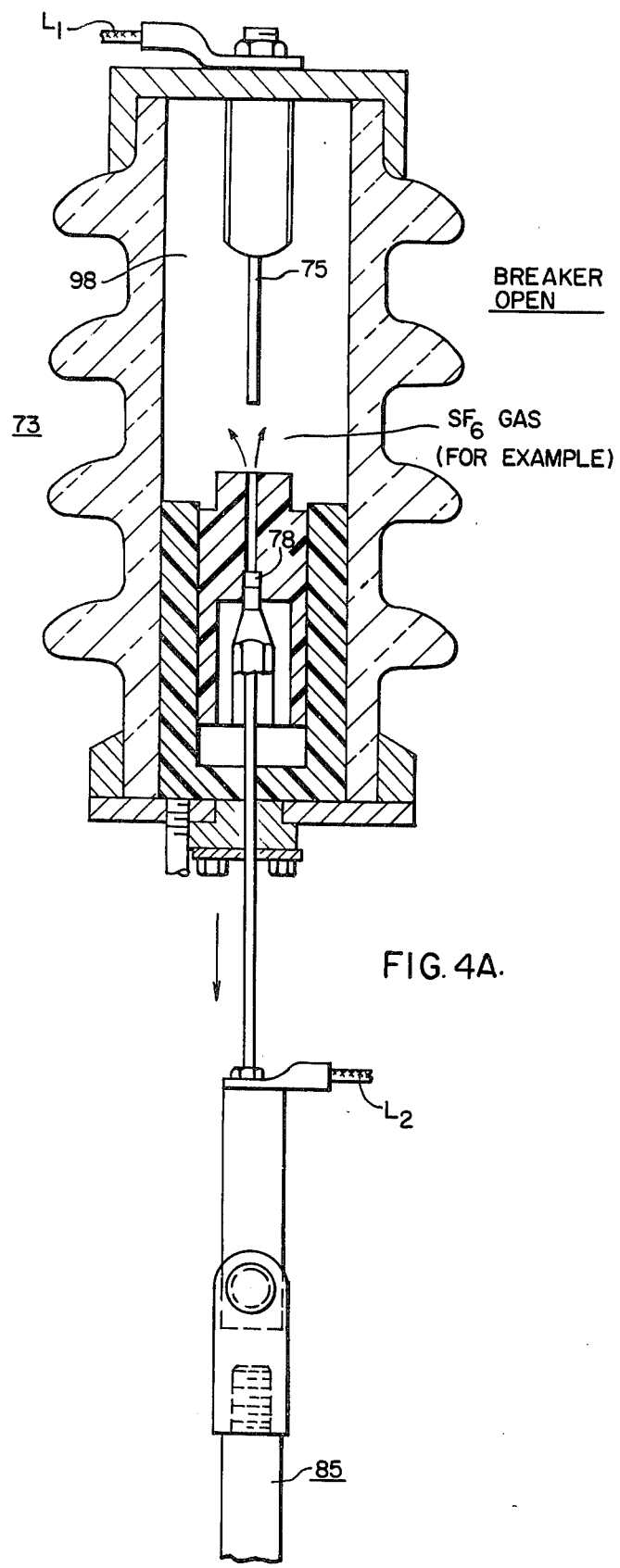
FIGS. 4A and 4B collectively show a view somewhat similar to that of FIGS. 3A and 3B but showing the open position of the valve under high-voltage conditions; and, FIG. 5 illustrates a side elevational view of the valve assembly of FIG. 3B with the valve shown in the closed position, taken along the line V—V of FIG. 3B.
Figure 4B:
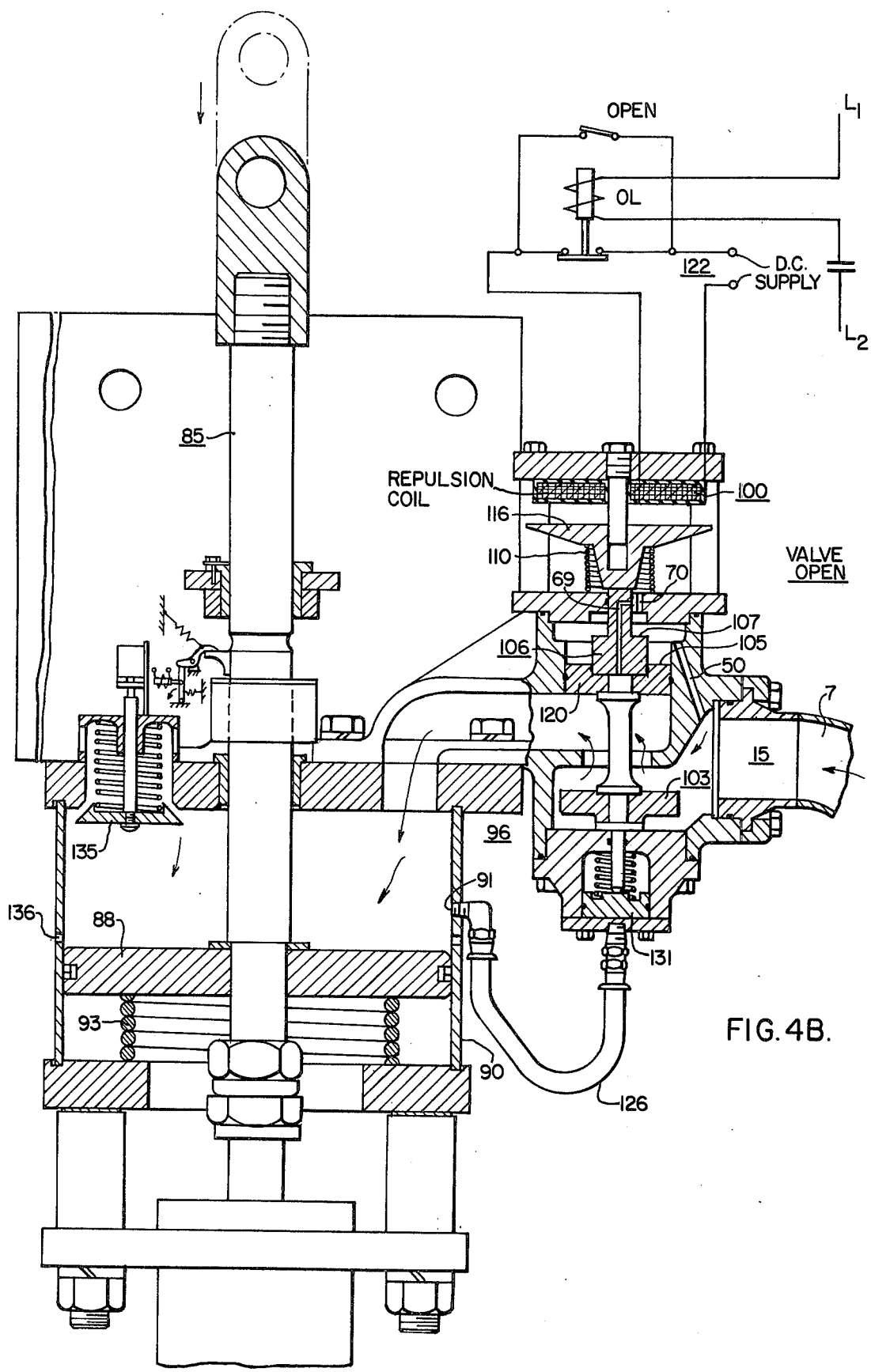
Figure 5:
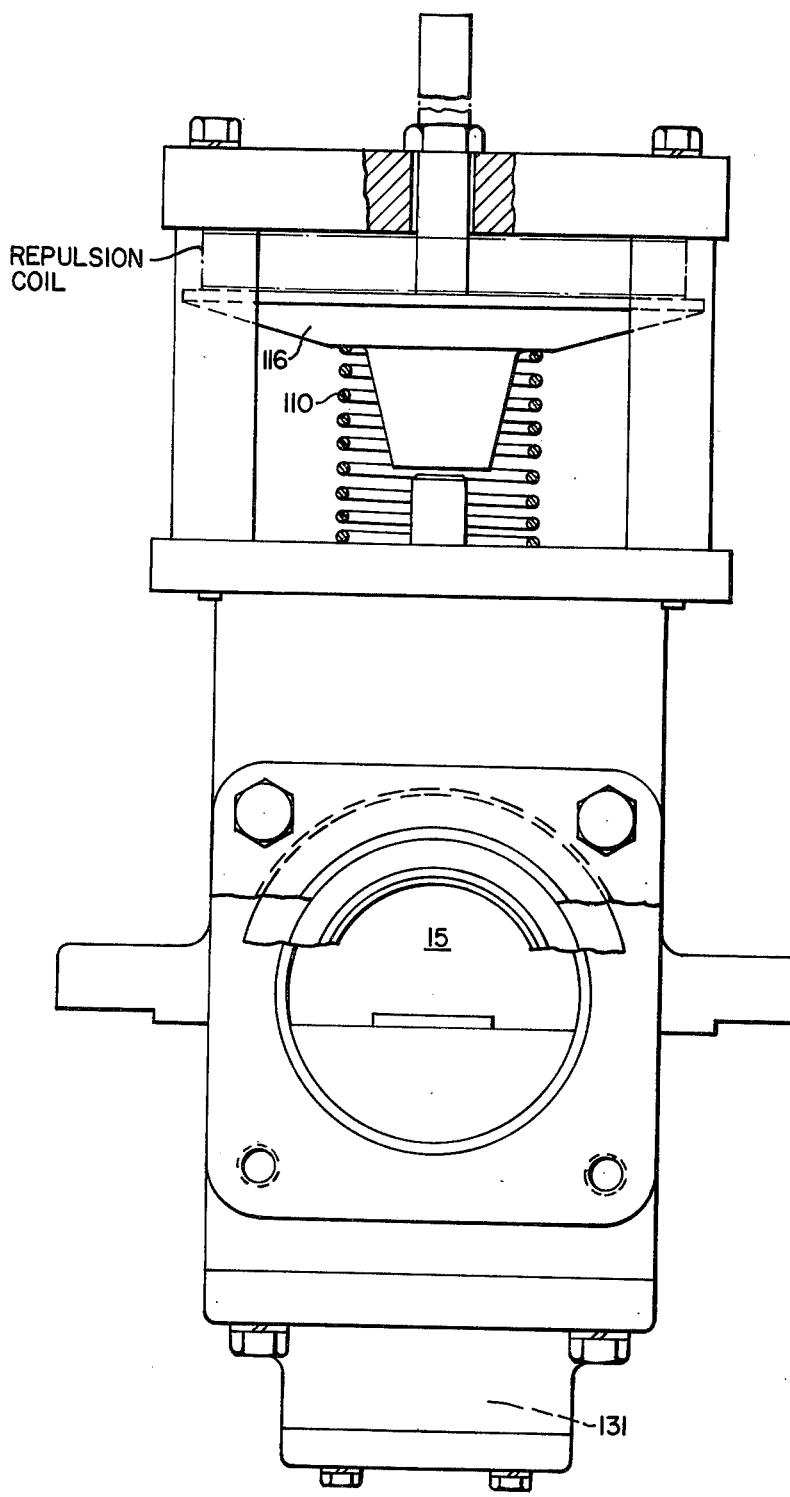

The tripping signal discharges the power supply 122, which energizes the repulsion coil 100. The anvil 116 is repelled downwardly as shown in FIG. 4B, thereby forcing the valve-stem pilot-piston 106 into the balance piston 120. This action exposes the upper face 107 of the valve-stem pilot-piston 106 to the high-pressure air 15 acting upon the balance piston 103. These two pistons 120 and 107 act together to overcome the seating force on the valve poppet assembly 103. The force driving the poppet assembly 103 as shown in FIG. 4B downwardly to open the valve 103 as shown in FIG. 4B is primarily the inertia force of the anvil 116. However, if the coil 100 has been energized with a below-normal voltage, it will have imparted insufficient energy to the anvil 116 to open the main valve 103 directly. The pressure force on pistons 107 and 120 will then act to force the poppet-assembly 106 downwardly, and thus open the main valve 103, but at a slower rate.

High-pressure air will flow through the main valve 103 and onto the piston 88 in the cylinder 90 as shown in FIG. 4B. The force of the high-pressure air on the piston 88 provides the opening force to the circuit-breaker linkage 85, which opens the electrical contacts 75, 78, and compresses sulfur-hexafluoride (SF$_6$) gas 98, for example, in the puffer interrupter 73. The air valve 103 recloses when the piston 88 travels far enough to supply high-pressure air to the valve-return piston 131 through a passage 126 from the cylinder wall 91 to the return piston 131.

The dump valve 135 is held closed by the pressure inside cylinder 90 as the piston 88 is forced downward. In the full open position of the mechanism the shaft 85 is latched as shown in FIG. 4B, thereby holding the mechanism 96 open against the close spring 93. After the main valve 103 is closed by means of passage 126 and piston 131, the air inside cylinder 90 vents out through ports 136 to the atmosphere, and the dump valve 135 opens.

When the latch 81 on shaft 85 is tripped by closing solenoid 82, the close spring 93 forces the mechanism 96 closed by pushing piston 88 upwards. The dump valve 135 is open until the end of this motion, thus preventing pressure build on top of the piston 88 which would retard the close spring action. The dump valve 135 is closed by piston 88 when it reaches its uppermost position as shown in FIG. 3B. At this time the mechanism 96 and the interrupter contacts 75, 78 have been reset to the closed-circuit position.

From the foregoing description of the invention it will be apparent that there has been provided an improved electrically-actuated pneumatic main valve 24, 103, which under normal-voltage conditions provides a direct mechanical force response between the coil 100 and the main valve 103 itself, but under reduced, or diminished-voltage conditions, provides an augmenting pneumatic force, which augments the mechanical force supplied by the electrical coil 40, 100 itself.

Although there has been illustrated and described specific structures, it is to be clearly understood that the same were merely for the purpose of illustration, and that changes and modifications may readily be made therein by those skilled in the art, without departing from the spirit and scope of the invention.

I claim:

1. An electromechanically operated valve comprising, in combination:
    A. means defining a valve body defining a gas-inlet opening and a gas-outlet opening;
    B. said valve body additionally defining a valve-seat between said inlet and outlet openings;
    C. high-pressure gas disposed in said inlet opening;
    D. relatively low-pressure gas disposed in said outlet opening;
    E. a two-part main poppet-valve assembly comprising:
        a. a first part (23) comprising a main valve (24) seating on said valve seat and thereby controlling the gas flow through the valve body;
        b. a balance piston portion (32) affixed to said main valve (24) and comprising a first piston portion (32) constantly exposed to high-pressure gas;
        c. said balance piston portion (32) having a second piston portion (33) exposed to low-pressure gas (17) in the closed-valve position;
        d. said main poppet-valve assembly (20) comprising a second part (27) comprising an independently-movable pilot-piston assembly (30) at times making abutment with said balance piston (32) to thereby effect opening of the main poppet valve (24);
        e. said pilot-piston assembly (30) comprising a first piston portion (31) alternately exposed to low and high-pressure gas dependent upon opening movements of the pilot-piston assembly 30; and,
    F. electrical means (35) for providing an impact thrust to said pilot-piston assembly (30) upon energization of the electrical means, whereby upon low-voltage conditions and correspondingly reduced electrical impact thrust, the pilot-piston assembly (30) will move sufficiently to expose the first piston portion (31) to high pressure gas and receive an augmented pneumatic thrust force to open the main poppet valve (24).

2. The electromechanically-operated valve of claim 1, wherein the electrical means comprises a repulsion coil (40), and the pilot-piston assembly (30) includes an integral anvil portion (44) responsive to the energization of said repulsion coil (40).

3. The combination of claim 1, wherein the electrical means comprises a repulsion coil 40, an anvil member 116 is provided responsive to energization of the repulsion coil (100) to be repelled therefrom, and said anvil member (116) strikes the pilot-piston assembly (106) during energization of the repulsion coil (100).

4. The combination according to claim 1, wherein a bypass high-pressure channel (50) is provided between the air-inlet portion of the valve body and the pneumatic region adjacent the third piston portion (32) of the main valve.

5. The combination of claim 1, wherein the balance piston portion (32) of the main valve (24) is annular and contains a recess portion (55) at the central portion thereof, and the pilot-piston assembly (30) has a protruding portion (60) which moves into the said recess and effects impact thrust upon the main poppet valve (24).

6. The combination according to claim 1, wherein the first piston portion (60) of the pilot-piston assembly moves within a recess portion (55) of the valve body 32, and a vent port (65) provides atmospheric pressure to said latter-mentioned recess portion.

7. The combination according to claim 6, wherein the pilot-piston assembly (30) includes a stem portion (66), and an atmospheric vent-port (134) is provided through said stem portion to the recess portion (55) of the balance piston.

8. The electromechanically-operated valve of claim 1, wherein an anvil is provided, and the electrical means actuating movement of said anvil, which is a separate member from the pilot-piston assembly (30).

9. The electromechanically-operated valve of claim 1, wherein an anvil member is provided, the electrical means comprises a repulsion coil (40), said anvil member being responsive to energization of said repulstion coil, and said anvil constitutes a separate member which, at times, makes abutting engagement with said pilot-piston assembly (30).

* * * * *